(No Model.)
S. STEWART.
GRAIN CLEANER.
No. 449,599. Patented Mar. 31, 1891.
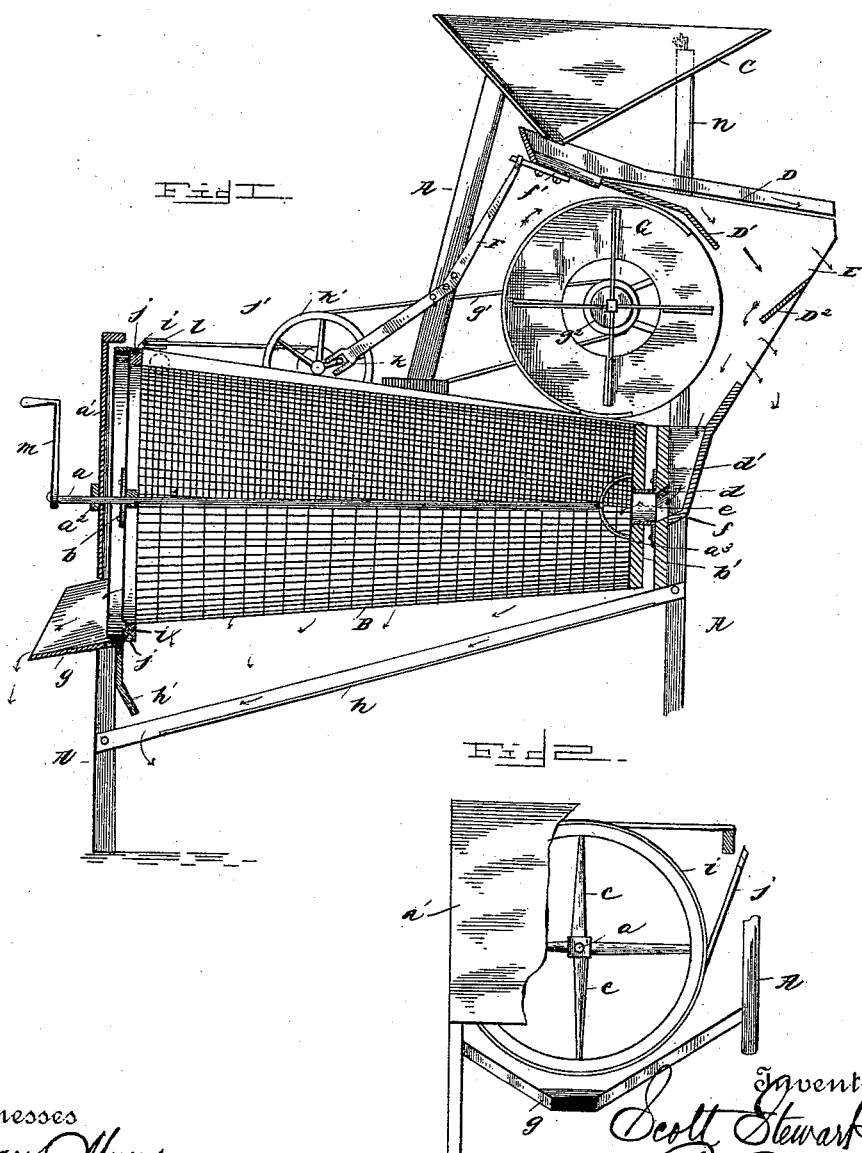

UNITED STATES PATENT OFFICE.

SCOTT STEWART, OF RIVESVILLE, WEST VIRGINIA.

GRAIN-CLEANER.

SPECIFICATION forming part of Letters Patent No. 449,599, dated March 31, 1891.

Application filed January 10, 1890. Serial No. 336,574. (No model.)

*To all whom it may concern:*

Be it known that I, SCOTT STEWART, a citizen of the United States of America, residing at Rivesville, in the county of Marion and State of West Virginia, have invented certain new and useful Improvements in Grain-Cleaners, of which the following is a specification, reference being had therein to the accompanying drawings.

My invention has for its object to provide an improved wheat-cleaning machine wherein are employed a vibrating screen or riddle in connection with a suitable feed-hopper, a rotary conical sieve and a fan, all adapted for conjoint action; and it consists of the detailed construction and combination of parts, as will fully appear from the following description and accompanying illustration.

In the drawings, Figure 1 is a sectional view of my grain-cleaner. Fig. 2 is an end elevation thereof, parts being broken away.

In the embodiment of my invention I employ a suitable supporting-frame A and mount therein a conical sieve B by means of a central shaft $a$, the forward end of which passes through a board $a'$ at one end of the frame A and through a suitable bearing $a^2$, secured to said board, said shaft also passing through an apertured bearing-plate $b$, fastened to the point of union between a series of spoke-like-arranged bars or arms $c$, secured at their outer ends to the circular frame of the larger end of the sieve B. The shaft $a$ has its rear end provided with short curved arms $a^3$, which are screwed or fastened to rear end cross-bars $b'$ of the frame of the sieve B, and to which end bars at the center is secured an apertured bearing-plate $d$. To an opposite bar $d'$ of the frame A is secured a hollow journal $e$, engaging the aperture of the bearing-plate $d$, thus supporting or journaling the rear end of the sieve and providing for the feeding or passage of the wheat thereinto from a downward-tapering chute or funnel $f$, secured to said end bar $d'$ and discharging into said hollow journal. The sieve B has a wire-cloth covering of two different meshes, one section thereof, which has a small square mesh, covering one longitudinal half of the circumference of the sieve, while the other section of said cloth has an oblong mesh and covers the other longitudinal half of the sieve. The wheat received into the sieve as it is revolved, as presently explained, is carried toward and delivered therefrom at its larger end into a spout $g$, and finally falls into a suitable receptacle or upon the floor of the building. The cockle, cheat, split and small grains pass through the sieve and fall upon a spout $h$, having at its forward lower end a pendent inwardly-inclined stop-board $h'$ uniting therewith to discharge or deliver the same upon the floor or below. Around an outer grooved circular rim or pulley $i$, secured to the larger end of the sieve B, is passed a belt $j$, encompassing a small pulley $j'$ on the driving-shaft bearing a second pulley $k'$. The belt is guided to the pulley $j'$ by means of a supplementary pulley or idler $l$, suitably arranged and mounted upon the frame A. The motive power is applied to the sieve B through the handle or crank $m$, actuated by hand or otherwise.

C is the hopper secured upon upper extension-bars of the frame A, and below this hopper is hung the riddle or screen D by means of hangers or pivoted rods $n$, hooked at their ends into eyes or staples on said hopper and screen or riddle. The screen or riddle D has a downwardly-deflected lower board or deflector D', delivering the wheat passing through it upon an oppositely-disposed board or deflector D², secured to the side of the shoe E, in the upper part of which said screen or riddle is located. From the deflector or board D² the grain passes into the chute $f$, thence passing, as before stated, through the hollow journal $e$ into the sieve B. The riddle or screen D receives motion—a vibratory one—by means of an elbow or obtuse-angled lever F, adjustably pivoted upon an upright of frame A, and connected at one end to a bar or rod $f'$, secured to said riddle or screen, the opposite end of said lever or elbow having a slot which receives a crank of the driving-shaft $k$.

G is the fan, which is suitably hung in the shoe E and driven by a belt $g'$, encompassing a small pulley $g^2$ on its shaft and the pulley $k'$, before referred to. The fan G is so arranged that just as the wheat leaves the riddle or screen D and is passing therefrom to the chute $f$ it will subject the wheat to a blast of air which will eliminate from the wheat all light or foreign particles, and thus permit it to finally enter the rotary sieve B below in a greater or less purified state, the remaining impurities being removed from the wheat by the sieve B.

Having thus described my invention, what I claim is—

The grain-cleaner consisting of the conical different-sized-mesh screen having its receiving end supported upon a hollow fixed journal and actuated by a handled shaft suitably journaled and fixed to said screen, the feeding-hopper supported in a fixed position, the riddle hung by hangers from said hopper and having a downwardly-deflected lower board or deflector, the inclined board or deflector disposed opposite to the aforesaid deflector and secured to the shoe, the downward-tapering chute arranged to receive the grain striking the latter deflector or board and discharging into the hollow journal, the obtuse-angled lever or pitman actuating said riddle, the fan suitably mounted in the shoe, and the driving-pulley shaft bearing two different-sized pulleys, the belt encompassing one of said pulleys and driving the fan and a second belt encompassing the other of said pulleys and passing around an idler and around a grooved circular rim of the conical screen, substantially as set forth.

In testimony whereof I affix my signature in presence of two witnesses.

SCOTT STEWART.

Witnesses:
W. M. YONG,
H. J. PRICE.